United States Patent
Elterman et al.

(10) Patent No.: US 7,670,078 B2
(45) Date of Patent: Mar. 2, 2010

(54) DUST BOOT WITH GREASE RELIEF PASSAGE

(76) Inventors: James Elterman, 12538 Lusher Rd., St. Louis, MO (US) 63138; Alexander Karpman, 5110 Rolling Green Ln, Ballwin, MO (US) 63011

( * ) Notice: Subject to any disclaimer, the term of this patent is extended or adjusted under 35 U.S.C. 154(b) by 0 days.

(21) Appl. No.: 11/510,327

(22) Filed: Aug. 25, 2006

(65) Prior Publication Data

US 2007/0048081 A1   Mar. 1, 2007

Related U.S. Application Data

(60) Provisional application No. 60/711,207, filed on Aug. 25, 2005.

(51) Int. Cl.
*F16C 11/00* (2006.01)
(52) U.S. Cl. .......... 403/134; 403/50; 277/635; 277/928
(58) Field of Classification Search ............ 403/50, 403/51, 134, 288; 277/634, 635, 636, 928, 277/552
See application file for complete search history.

(56) References Cited

U.S. PATENT DOCUMENTS

| | | | |
|---|---|---|---|
| 2,559,857 A * | 7/1951 | Edwards | 403/134 |
| 3,208,290 A | 9/1965 | Mathues et al. | |
| 3,208,779 A | 9/1965 | Sullivan, Jr. | |
| 3,248,955 A | 5/1966 | Templeton | |
| 3,279,834 A | 10/1966 | Budzynski | |
| 3,391,952 A | 7/1968 | Zeigler | |
| 3,451,700 A | 6/1969 | Smith | |
| 3,476,417 A * | 11/1969 | Born et al. | 403/134 |
| 3,596,915 A | 8/1971 | Snidar | |
| 4,154,546 A | 5/1979 | Merrick et al. | |

(Continued)

FOREIGN PATENT DOCUMENTS

JP    03074625    3/1991

*Primary Examiner*—Michael P Ferguson
(74) *Attorney, Agent, or Firm*—Robert L. Stearns; Dickinson Wright, PLLC

(57) ABSTRACT

A joint enclosure apparatus includes a dust boot having an opening and a rim located adjacent to the opening, a flexible flap formed as a portion of the rim, and at least one grease relief passage located on an outer surface of the dust boot adjacent to the flexible flap. The dust boot is useful for use in a ball joint assembly which includes a ball stud having a shank portion and a ball portion; a housing adapted to receive the ball portion in articulatable engagement in a ball stud exit end; a dust boot having a shank opening in sealing engagement with the shank portion and a housing opening in sealing engagement with the housing at the ball stud exit end and a rim adjacent to the shank opening; a flexible flap formed as a portion of the rim; and at least one grease relief passage located on an outer surface of the dust boot adjacent to the flexible flap. The grease relief passage may comprise a rib or a recessed channel. The area of the outer surface of the dust boot adjacent to the flexible lip may be undercut to control the relief characteristics of the flexible lip. As grease is flushed from the dust boot, it is directed along a path defined by the grease relief passage. If a dust boot becomes pinched during stud articulation, the grease relief passage provides an escape path for grease after it passes the flap.

16 Claims, 5 Drawing Sheets

U.S. PATENT DOCUMENTS

| | | |
|---|---|---|
| 4,567,973 A | 2/1986 | Butz |
| 5,046,745 A | 9/1991 | Sweetland et al. |
| 5,312,200 A | 5/1994 | Buhl et al. |
| 5,316,317 A | 5/1994 | Fedorovich et al. |
| 5,466,084 A | 11/1995 | Brueggen et al. |
| 5,568,930 A * | 10/1996 | Urbach ....................... 403/134 |
| 5,735,530 A | 4/1998 | Merkin et al. |
| 6,029,980 A * | 2/2000 | Downes ....................... 277/552 |
| 6,164,657 A | 12/2000 | Merkin et al. |
| 6,290,235 B1 * | 9/2001 | Albertson .................... 277/552 |
| 6,308,959 B1 * | 10/2001 | Sokolihs et al. ............... 403/51 |
| 6,582,146 B2 | 6/2003 | Raymoure |
| 7,115,036 B2 | 10/2006 | Masuda |

\* cited by examiner

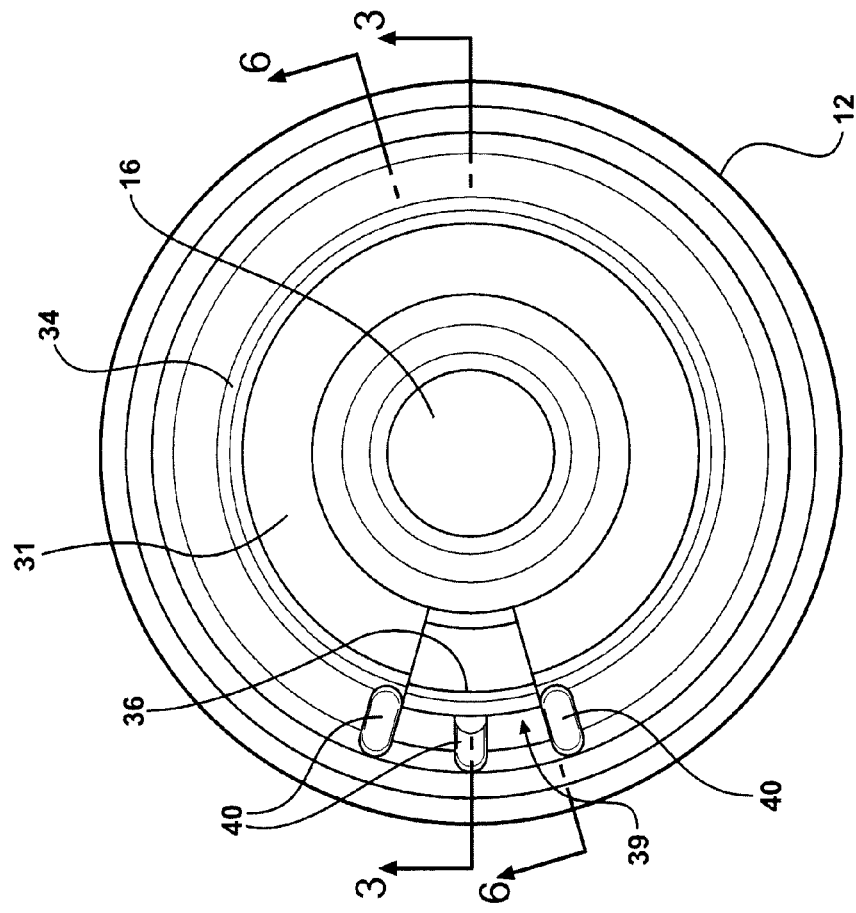
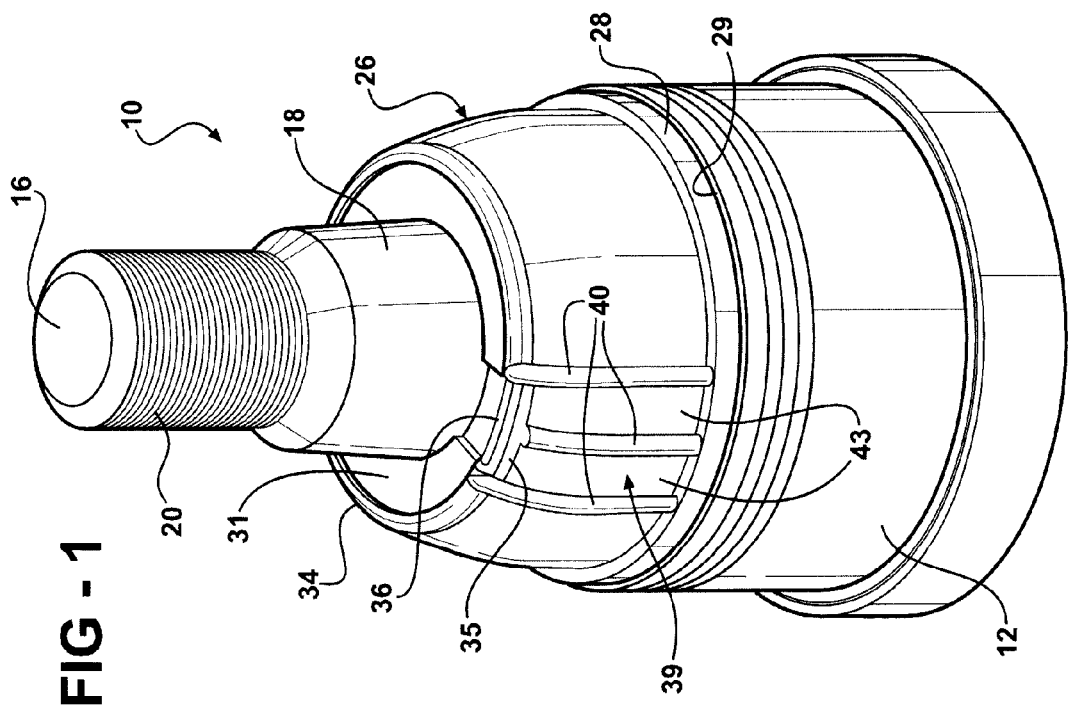

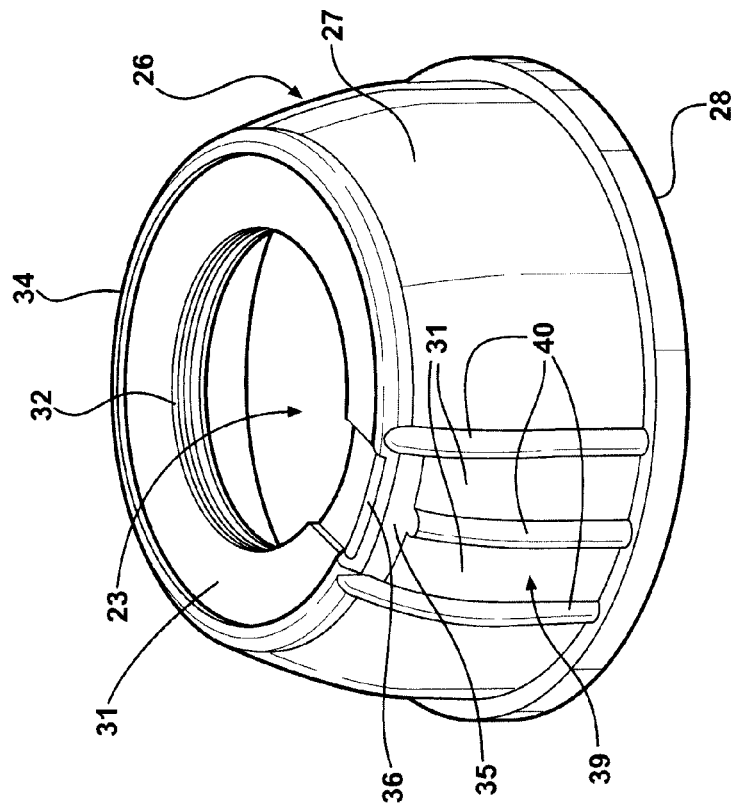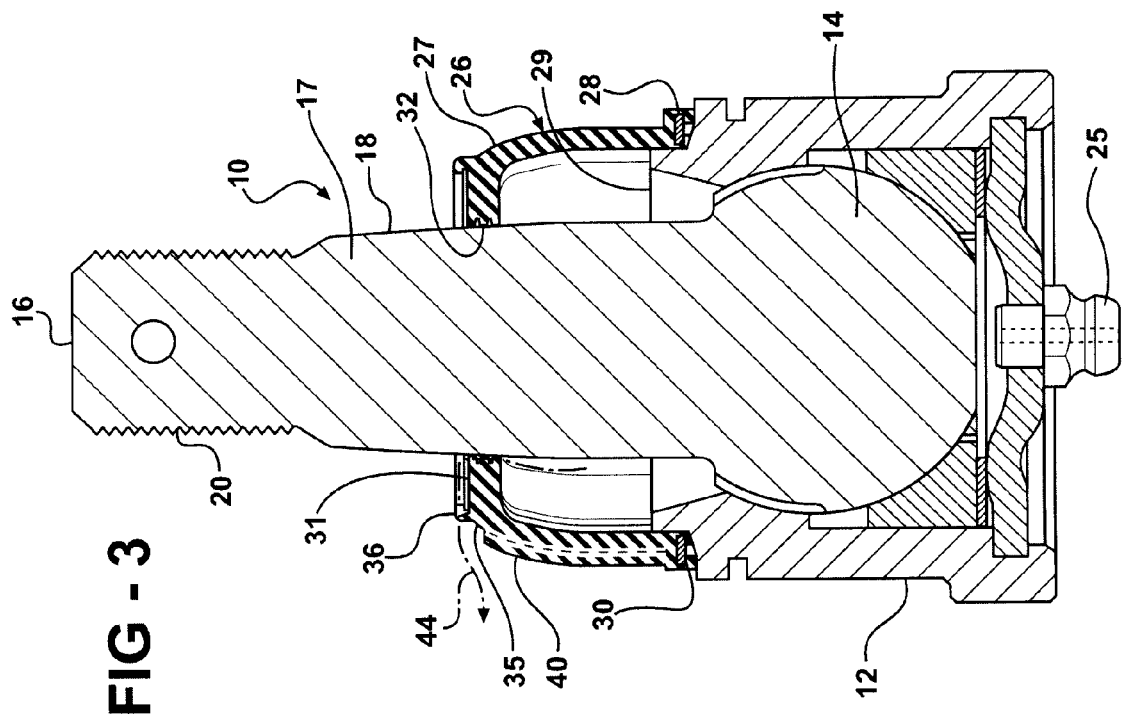

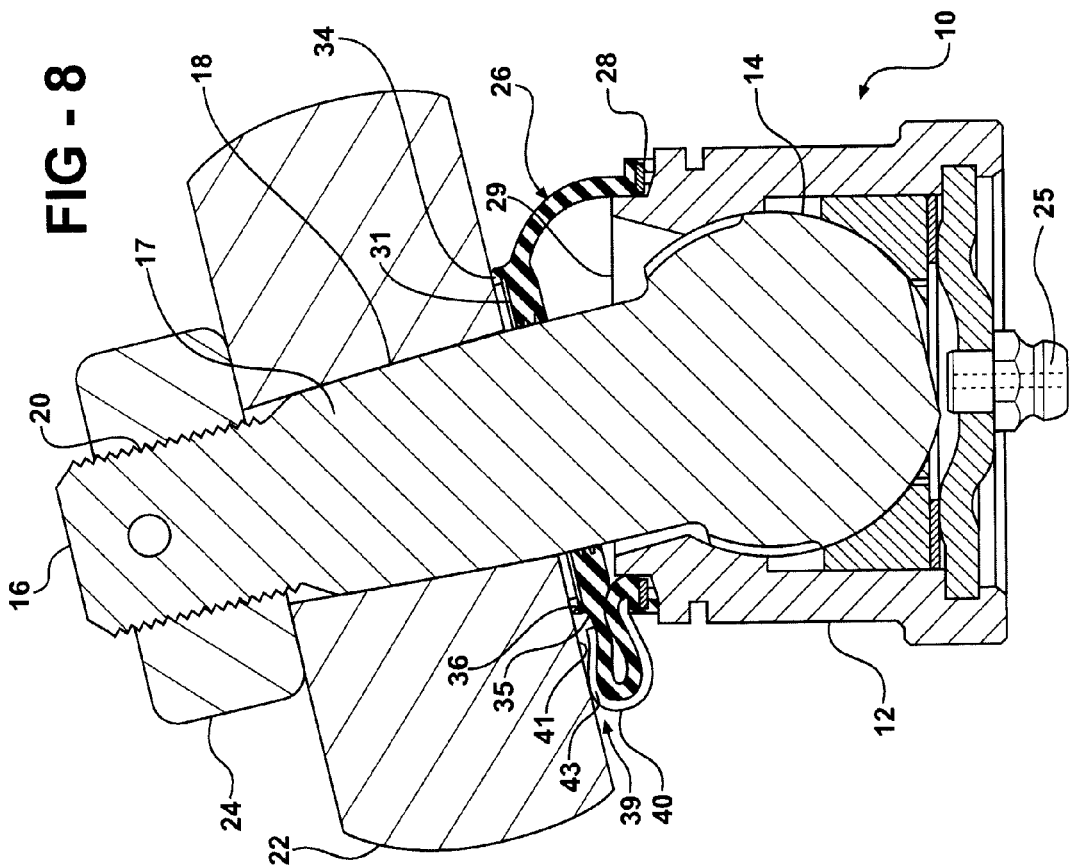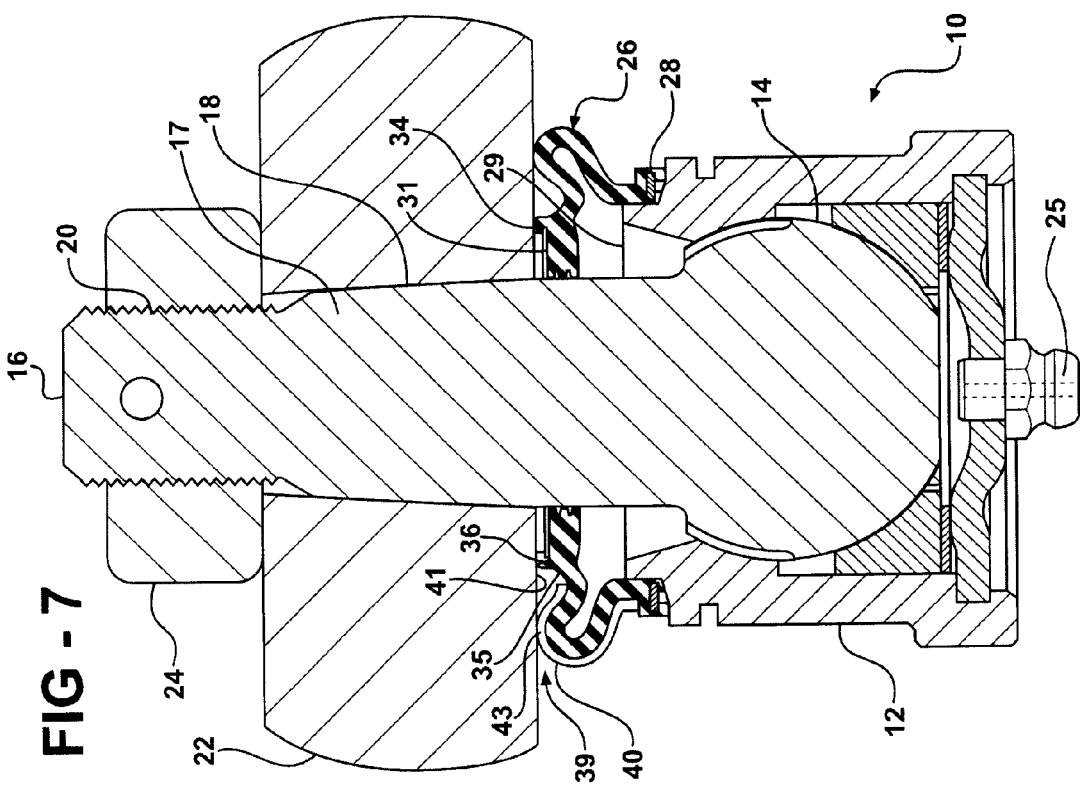

DUST BOOT WITH GREASE RELIEF PASSAGE

CROSS-REFERENCE TO RELATED APPLICATIONS

This patent application claims priority to U.S. Provisional Patent Application Ser. No. 60/711,207, filed Aug. 25, 2005, which is incorporated herein by reference in its entirety.

BACKGROUND OF THE INVENTION

1. Field of the Invention

This invention relates to a boot type seal especially adapted for ball and socket type joints. More particularly, it relates to a boot type seal for ball and socket type joints having a grease relief passage or passages on an outer surface thereof.

2. Related Art

Nearly all original chassis equipment, such as ball joints and tie rod ends, are sealed units. These "lube-for-life" parts are low maintenance since they are sealed, but generally do not have the longevity of a "greaseable" part. A greaseable part is one in which additional grease may be added periodically to replace grease which has escaped or broken down during use, thereby flushing old grease, debris associated with wear of the joint parts or other contaminants (e.g., moisture, dirt or the like) from the joint and replacing it with new grease to reduce friction and increase the service life of the component. Accordingly, greaseable parts are preferred for many applications, particularly in the automotive aftermarket and service parts markets. One challenge faced when designing a dust boot for a greaseable part is that the dust boot must serve as a barrier to prevent contamination from entering the articulating component. At the same time, the dust boot must allow grease, joint debris and other contaminants to escape when the part is flushed with new grease, such as by a repair technician, or when articulation of the joint or compression of the dust boot, or both, create conditions where there is an excess of grease within the dust boot or a portion thereof.

The dust boot is normally compressed against a control arm or other mating component of the suspension in conjunction with its installation. In some applications and joint designs where there is a large amount of stud swing, or where the boot is compressed against the control arm or other mating component over a relatively large portion of its surface area, a condition may arise where the dust boot surface may form an additional seal around the grease relief flap thereby preventing the release of grease from the grease relief passage. This becomes a concern when the stud is articulated in the same direction as the primary grease exit passage. In other words, the compression of the boot, particularly in the region of the grease evacuation flap, can result in trapped grease in the boot. If the dust boot is not able to release the grease, it may accumulate an excess of pressure causing the boot to burst or rupture during lubrication or operation of the joint, or for the grease to be released from the dust boot and joint at a location other than the intended exit point and escape path. Therefore, it is very desirable to develop greaseable dust boots which overcome the aforementioned limitations of prior art devices.

SUMMARY OF THE INVENTION

This invention comprises the incorporation of at least one grease relief passage on the outer surface of a dust boot. The passage is preferably located proximate to a cooperating grease relief flap. The passage may comprise a feature such as a rib, or plurality of ribs, that protrude from the outer surface of the boot, or alternately, it may comprise a feature formed into the surface, such as a groove, a plurality of grooves or other surface relief pattern sufficient to provide the necessary passageway.

In one aspect, the invention comprises a grease relief passage including three ribs located on the outer surface proximate the relief flap which extend radially from the flap across the outer surface of the dust boot. In this embodiment one rib is located on each side of the grease evacuation flap, and one aligned directly underneath it. The two outside ribs extend from the small end of the dust boot away from the stud opening, preferably to at least three-quarters of the distance to the large end. The middle rib extends from just below an undercut extending next to the flap also away from the stud opening, also preferably to at least three-quarters of the distance to the large end. However, all of the ribs may terminate at the large end of the dust boot if desired.

In one aspect, the invention comprises a grease relief passage including two radially extending grooves or channels formed in the outer surface separated by a rib. The surface of the rib may be co-planar with the extension of the outer surface of the boot, or may be raised above or relieved below this plane.

In yet another aspect, the invention comprises a ball joint having a ball stud, a bearing, housing and a dust boot to enclose them which incorporates at least one grease relief channel on the outer surface of the dust boot.

As grease is flushed from the dust boot, it is directed along a path defined by the grease relief passage. If a dust boot becomes pinched during stud articulation, the grease relief passage provides an escape path for grease after it passes the flap. Accordingly, even if the dust boot becomes compressed so that a fold develops in the body of the dust boot and presses against the underside of the control arm or spindle, an evacuation route remains for the grease to make a full and complete exit from the dust boot interior, thereby avoiding the pressurization of the dust boot and the possibility of its bursting or rupture, or of causing the grease to escape from the joint other than by the intended escape path.

BRIEF DESCRIPTION OF THE DRAWINGS

These and other features and advantages of the present invention will become more readily appreciated when considered in connection with the following detailed description and appended drawings, wherein like numerals indicate like or corresponding parts throughout the several views, and wherein:

FIG. 1 is a perspective view of a ball joint assembly including a dust boot according to the subject invention;

FIG. 2 is a top view of the assembly shown in FIG. 1;

FIG. 3 is a cross-sectional view taken generally along lines 3-3 in FIG. 2;

FIG. 4 is a perspective view of the dust boot according to this invention;

FIG. 7 is a cross-sectional view of the ball joint assembly of FIG. 2 including a representative control arm fixed to the stud and holding the dust boot in an over-compressed condition to demonstrate the novel grease relief passage features of the invention;

FIG. 8 is a cross-sectional view of the ball joint assembly of FIG. 2 including a representative control arm fixed to the stud holding the dust boot in an over-compressed condition and fully articulated to further demonstrate the novel grease relief passage features of the invention.

DETAILED DESCRIPTION OF THE PREFERRED EMBODIMENT

Figure 9:
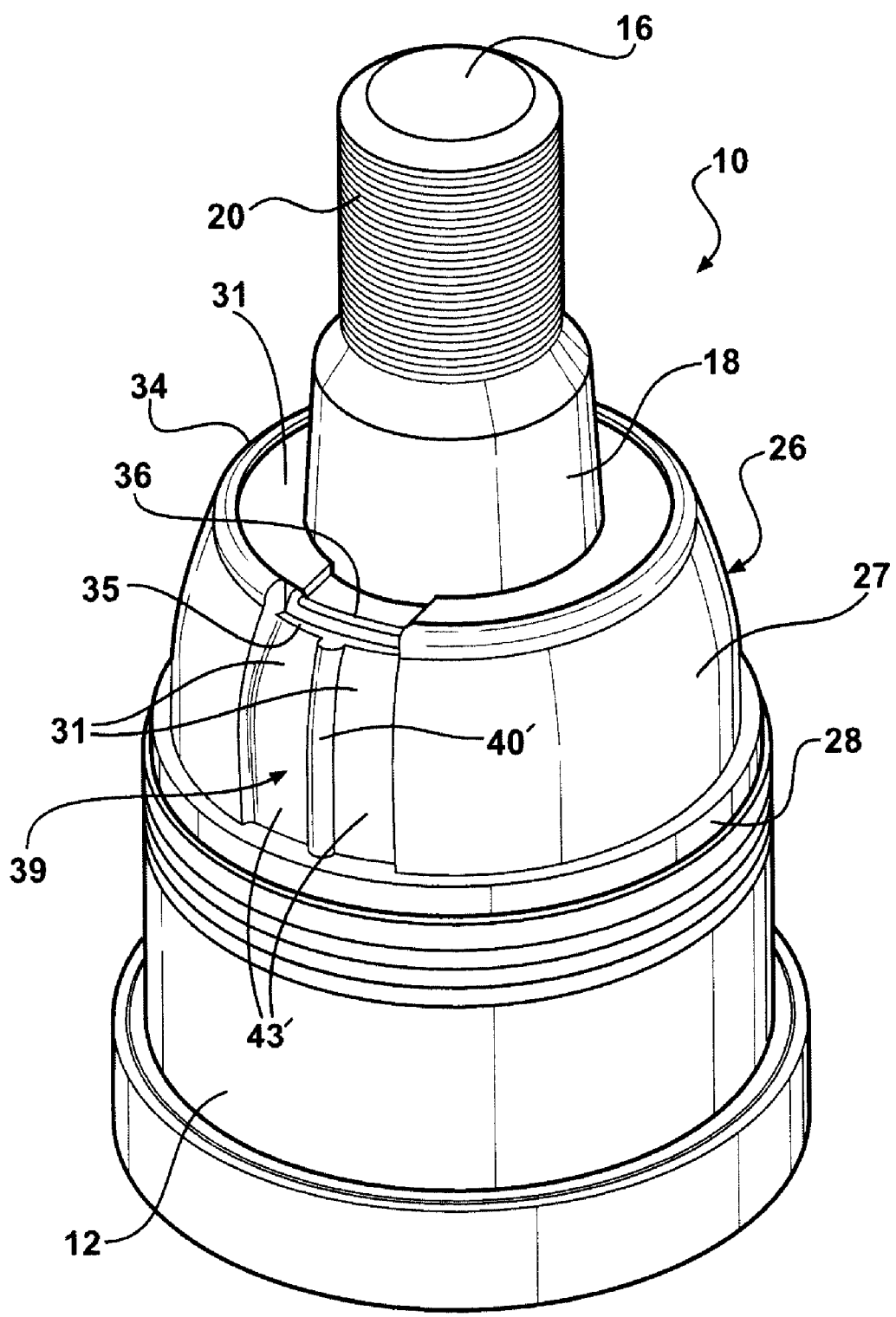
FIG. 9 is a perspective view of an alternate ball joint assembly including a dust boot according to the subject invention.

A typical ball joint assembly is generally shown at 10 in FIGS. 1, 2, 3, 6, 7 and 8, and in an alternate arrangement in FIG. 9. The ball joint assembly 10 includes a cup-like housing 12, preferably formed from a metal such as steel, in which is captured the articulating ball portion 14 of a ball stud 16, also preferably formed from a metal such as steel. The ball stud 16 also includes a shank portion 17 that extends integrally from the ball portion 14, outwardly from the housing 12. The shank portion 17 has a tapered connection surface 18 and a threaded end 20. As shown in FIGS. 7 and 8, a control arm 22 may be joined to the tapered connecting surface 18 of ball joint assembly 10 and secured into position via nut 24. Instead of the depicted control arm 22, another anchoring feature such as a knuckle, spindle, link or frame or chassis component can be used. The joint is adapted to receive grease or other lubricant through grease fitting 25

Figure 6:
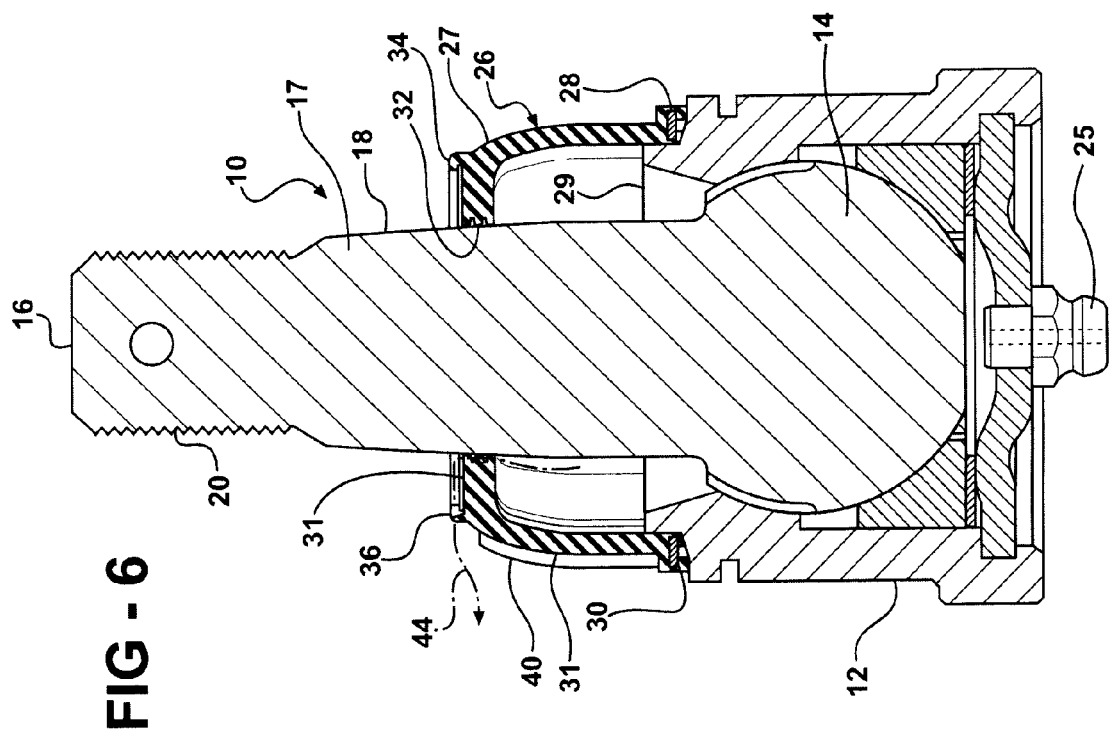
FIG. 6 is a cross-sectional view taken generally along lines 6-6 in FIG. 2.
Figure 5:
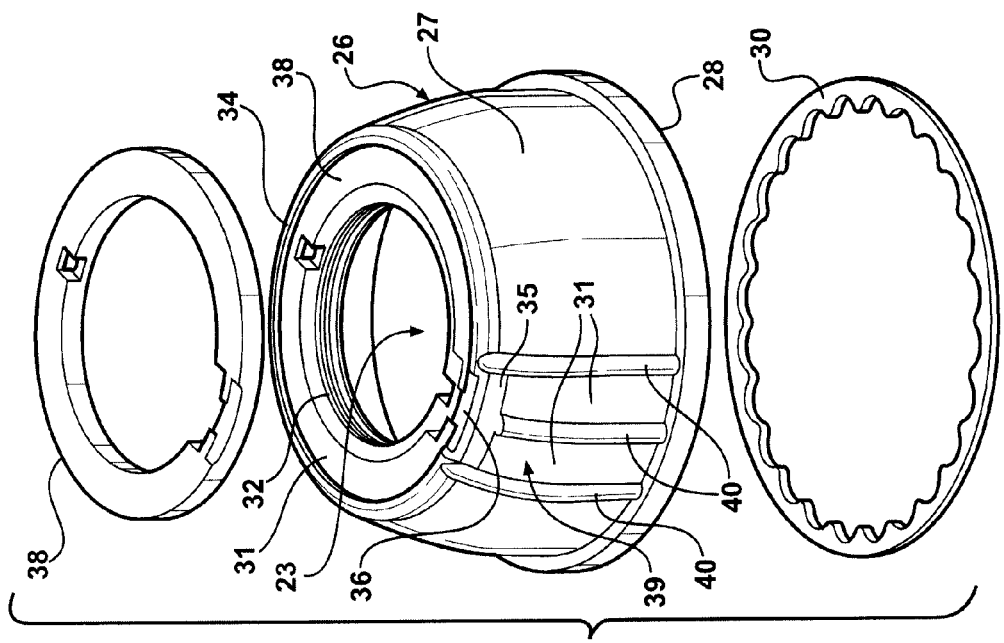
FIG. 5 is an exploded view of an alternative dust boot assembly which includes an insert at the stud opening and an insert at the housing opening.

Referring to FIGS. 4 and 5, the joint assembly also comprises a joint enclosure for enclosing and sealing the housing 12 and ball portion 14 from the external environment, including dust, dirt and moisture and also cooperating with them to contain a lubricant such as grease, comprises a dust boot, generally indicated at 26 having an outer surface 27, possesses a generally domed shape including a large opening 28 or housing opening 28 having a lip or other feature adapted to fit tightly against the stud exit end 29 of the ball joint housing 12. Dust Boot 26 is generally formed from an elastomer, such as natural or synthetic rubber and the like. The dust boot may have other shape configurations instead of domed. The large opening 28 of the dust boot 26 can be reinforced with a rigid ring 30, such as a steel ring, as perhaps best shown in the exploded view of FIG. 5. The small opening 23 or shank opening 23 of the dust boot 26 surrounds the stud 16 on shank portion 17 and includes one or more wiping lips 32 which dynamically seal against the exterior surface of shank 17. An annular rim 34 is spaced radially outwardly of the shank opening and projects axially upwardly from the dust boot 26 to bear in pressing engagement against the surface of the control arm 22 (or other feature), thus perfecting a substantially fluid tight seal therebetween. The rim 34 is formed with a flexible flap 36 which is designed with respect to its shape (e.g., cross sectional profile), size (e.g., height, length and thickness), location and other aspects to yields under a sufficient pressure differential to permit evacuation of excess grease or other lubricant from the inner confines of the dust boot 26 at flexible flap 36 preferentially to other portions of the rim 34 or of other points of contact between elements of ball joint 10 and dust boot 26. An undercut 35 is provided just below the flap 36 which functions to thin the wall thickness adjacent to flap 36 and thereby reduce the pressure required for grease to push open the flap 36 as compared with the pressure that would be required at other portions of rim 34.

As shown in FIG. 3, excess grease passes through the wiping lips 32 and through an end face passage recessed into an annular end face of dust boot 26 which radially extends between the shank opening 23 and the rim 34 along a route past the flap 36 depicted by the arrow depicting grease path 44. Alternatively, as shown in FIG. 5, an insert 38 can be fitted into a retaining channel adjacent the wiping lips 32. One or more internal through holes in the insert 38 align with one or more chaplet holes in the rubber of the dust boot 26 to route excess lubricant from the interior of the dust boot 26 at a location spaced away from the wiping lips 32. However, in this arrangement excess grease is still directed to flap 36 where it may exit boot 26 in the manner described above along grease path 44.

In some circumstances it is possible for the control arm 22 (or other feature) to over-compress the dust boot 26. If this occurs in a region adjacent the flap 36, the buckled side wall of the dust boot 26 may unintentionally block egress of lubricant from the assembly 10, and particularly dust boot 26. As explained above, this can have a damaging affect on the ball joint assembly 10. To overcome this issue, the dust boot 26 is provided with at least one grease relief passage 39. Referring to FIGS. 1-8, this passage is formed by a plurality of longitudinally and radially extending ribs 40 cooperating together with the relief passage portion 31 of outer surface 27. It is believed that this may be provided by as few as one, but preferably as shown by three, longitudinally and axially extending ribs 40 protruding from the exterior surface 27 of the dust boot 26. In the embodiment shown in FIGS. 1-8, two outside ribs 40 extend on either side of the flap 36. The third or center rib 40 may be centered directly under the flap 36 as shown, or otherwise located between the two outer ribs 40. The ribs 40 cooperate with the passage portion 31 of outer surface 27, namely the portion or portions of outer surface 27 proximate the ribs 40 and flap 36 as well as the portion of outer surface 41 of control arm 22 proximate the ribs 40 to define grease relief passage 39. Grease relief passage 39 may include one or more channels 43 through which grease exiting dust boot 26 at flap 36 may flow. The two outside ribs 40 extend from the rim 34 to at least three-quarters of the distance to the large opening 28. The center ribs 40 extend from just below the undercut 35 along the flap 36 to at least three-quarters of the distance to the large opening 28. The approximate size for the rib 40 is dependent on the size of the boot 26, however a height of 0.030" has been determined to be an effective minimum size. In addition to variations in the length of ribs 40, the width and height and outer profile of the ribs may also vary and be different along their lengths, as well as from rib 40 to rib 40.

The ribs 40 guarantee an evacuation path for the grease in the event the dust boot 26 becomes over compressed and pinched during stud 16 articulation. Thus, the ribs 40 provide an grease escape path 44 for grease after the grease flows through the flap 36.

It is believed that the ribs 40 may also be segmented such the channels comprising grease relief passage 39 are effectively interconnected. It is believed that ribs 40 may also include any manner of protrusion or plurality of protrusions, such as a plurality of raised features (e.g., cylinders) or bumps, which serve to create a sufficient standoff between the outer surface 27 of dust boot 26 and outer surface of 41 of control arm 22 to form one or more channels comprising grease relief passage 39 between flap 36 and approximately the opposing end or large opening 28 of dust boot 26.

Referring now to FIG. 9, it is also believed that grease relief passage 39 may be formed as at least one channel 43 formed as a recess in passage portions 41 of outer surface 27. This channel 43' or channels 43' also extends generally longitudinally and radially from the flap 36 to the opposing end or large opening 28 of dust boot 26. It is believed that an effective minimum depth of channel 43 is about 0.030 inches. The rib 40' shown is flush with a plane comprising the extension of surface the extension of outer surface 27, however, it is believed that rib 40' may be extended above or be recessed slightly beneath the beneath this plane. In such embodiments, the channels 43 may be formed by at least one rib 40', or alternately by a plurality of ribs 40' which may be the same (e.g., have the same height, width and length) or different, analogous to the possible variations described above for protruding ribs 40.

Obviously, many modifications and variations of the present invention are possible in light of the above teachings. For example, the ribs 40 need not be continuous, but rather may have a segmented style. Alternatively, it may be possible to create a trough-like configuration which functions in much the same way to guarantee an escape path for excess grease. It is, therefore, to be understood that the invention may be practiced otherwise than as specifically described.

What is claimed is:

1. A dust boot, comprising:
an annular body defining an interior cavity having a housing opening at one longitudinal end of said dust boot for attaching to a housing, and a shank opening at an opposite longitudinal end of said dust boot for sealingly engaging a shank portion of a ball stud;
an annular end face surrounding said shank opening; and
an annular rim extending longitudinally outwardly from and along a periphery of said annular end face spaced radially outwardly from said shank opening by said annular end face, an outer surface of said dust boot extending from said rim to said housing opening;
said rim having a flexible flap to permit the evacuation of excess grease from within said interior cavity of said dust boot, said rim flexing radially outwardly to relieve excess grease;
an end face passage longitudinally recessed into said annular end face and radially extending between said shank opening and said rim along said annular end face; and
at least one grease relief passage extending longitudinally along said outer surface from adjacent said flexible flap toward said housing opening for receiving the flow of excess grease, said grease relief passage including an undercut portion extending radially into said outer surface of said dust boot adjacent said flexible flap;
wherein excess grease flows from within said interior cavity of said dust boot through said end face passage and said flexible flap and into said grease relief passage.

2. The dust boot of claim 1, wherein said grease relief passage comprises at least one raised rib extending radially from said outer surface.

3. The dust boot of claim 2, wherein said raised rib extends longitudinally and radially away from said shank opening along said outer surface.

4. The dust boot of claim 1, wherein said grease relief passage comprises three raised ribs extending upwardly from said outer surface and longitudinally and radially away from said shank opening along said outer surface.

5. The dust boot of claim 4, wherein a first one of said ribs is adjacent to one end of the flexible flap and a second one of said ribs is adjacent to the other end of said flexible flap and a third one of said ribs is between said first and second ones of said ribs.

6. The dust boot of claim 5, wherein said first one and said second one of said ribs extends about three fourths of a distance from said rim to said housing opening along said outer surface.

7. The dust boot of claim 1, including a plurality of axially spaced wiping lips provided in said shank opening.

8. The dust boot of claim 1, wherein said flexible flap is provided by a radially thinned portion of said rim.

9. A ball joint assembly, comprising:
a ball stud having a shank portion and a ball portion;
a housing having a ball stud exit end, said ball portion articulatably engaged in an interior of said housing and said shank portion extending from said housing;
a dust boot attached to said housing at said ball exit end, said dust boot having a shank opening in sealing engagement with said shank portion, and a housing opening in sealing engagement with said housing at said ball stud exit end; said dust boot comprising:
an annular body defining an interior cavity having a housing opening at one longitudinal end of said dust boot for attaching to a housing, and a shank opening at an opposite longitudinal end of said dust boot for sealingly engaging a shank portion of a ball stud;
an annular end face surrounding said shank opening; and
an annular rim extending longitudinally outwardly from and along a periphery of said annular end face spaced radially outwardly from said shank opening by said annular end face, an outer surface of said dust boot extending from said rim to said housing opening;
said rim having a flexible flap to permit the evacuation of excess grease from within said interior cavity of said dust boot, said rim flexing radially outwardly to relieve excess grease;
an end face passage longitudinally recessed into said annular end face and radially extending between said shank opening and said rim along said annular end face; and
at least one grease relief passage extending longitudinally along said outer surface from adjacent said flexible flap toward said housing opening for receiving the flow of excess grease, said grease relief passage including an undercut portion extending radially into said outer surface of said dust boot adjacent said flexible flap;
wherein excess grease flows from within said interior cavity of said dust boot through said end face passage and said flexible flap and into said grease relief passage.

10. The ball joint assembly of claim 9, wherein said grease relief passage comprises at least one raised rib extending radially upwardly from said outer surface.

11. The ball joint assembly of claim 2, wherein said raised rib extends longitudinally and radially away from said shank opening along said outer surface.

12. The ball joint assembly of claim 9, wherein said grease relief passage comprises three raised ribs extending radially upwardly from said outer surface and longitudinally and radially away from said shank opening along said outer surface.

13. The ball joint assembly of claim 12, wherein a first one of said ribs is adjacent to one end of the flexible flap and a second one of said ribs is adjacent to the other end of said flexible flap and a third one of said ribs is between said first and second ones.

14. The ball joint assembly of claim 13, wherein said first one and said second one of said ribs extends about three fourths of a distance from said rim to said housing opening along said outer surface.

15. The ball joint assembly of claim 9, wherein said grease relief passage comprises a plurality of channels recessed in said outer surface and extending longitudinally and radially away from said shank opening along said outer surface between said rim and said housing opening.

16. The ball joint assembly of claim 9, wherein said flexible flap is provided by a radially thinned portion of said rim.

* * * * *